United States Patent

[11] 3,564,217

[72] Inventor Norman F. Bounsall
Los Altos, Calif.
[21] Appl. No. 624,673
[22] Filed Mar. 16, 1967
Division of Ser. No. 329,033, Oct. 2, 1961, Patent No. 3,342,932.
[45] Patented Feb. 16, 1971
[73] Assignee Ampex Corporation
Redwood City, Calif.
a corporation of California

[54] COMBINED COUNT INDICATING AND PRESETTING SYSTEMS
7 Claims, 1 Drawing Fig.

[52] U.S. Cl. 235/92, 340/166
[51] Int. Cl. H03k 21/36
[50] Field of Search 340/347, 166, 168; 235/92

[56] References Cited
UNITED STATES PATENTS
3,076,956 2/1963 Hagan et al. 340/172.5
3,035,648 5/1962 Williams 177/20

*Primary Examiner*—Maynard R. Wilbur
*Assistant Examiner*—Robert F. Gnuse
*Attorney*—Robert G. Clay

ABSTRACT: A combined count indicating and presetting system having elements coupled in a gating matrix which is connected to particular bistable elements of a binary counter. The gating matrix has particular terminals coupled to a selector, which produces selective signal levels representative of the count pattern presented at the counter, and which therefore may provide output indications from the system. The same gating matrix is also used in bilateral fashion however, so that upon application of an appropriate presetting signal, the bistable elements may be set into a desired count relationship for further control sequences.

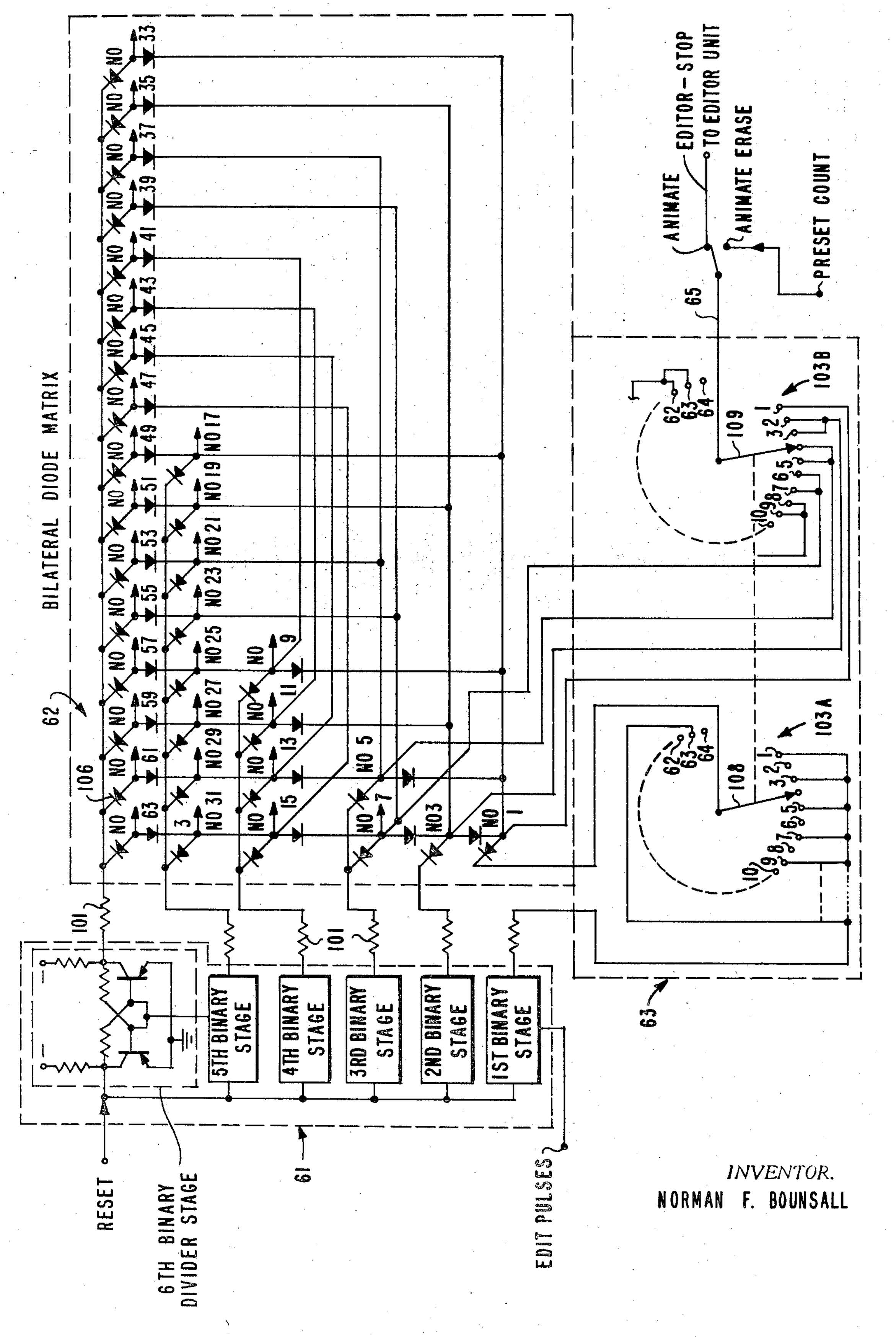
INVENTOR.
NORMAN F. BOUNSALL

COMBINED COUNT INDICATING AND PRESETTING SYSTEMS

BACKGROUND OF THE INVENTION

1. Field of the invention

This invention relates to electrical counters, and particularly to combined systems including a selective matrix which are capable of providing a count indication and which are capable of being preset with a particular count or counts.

2. Description of the Prior Art

In the electronic data processing arts, it is well known to utilize a decoding or grating matrix of diodes, switches or other elements in conjunction with a binary counter or register. Particular code combinations presented by the counter or register are identified by changes in the signal levels occuring at specific points within the matrix. Thus, a binary code pattern presented by the counter or register may be converted to a decimal code, or a one-of-a-number code, for readout indications or other control functions. It is also known in the electronic data processing arts to control the counter or register, or other binary indicator by input control circuits which upon command may insert a specific binary count. By thus presetting a counter to a particular count, the system may, for example, thereafter proceed through a desired sub routine or controlled sequence. The control circuits utilized for presetting purposes, however, are separate from the gating matrices which operate in response to the states of the counter stages themselves. In contrast, the systems provided in accordance with the invention permit the same matrix to be used both for identification of particular binary patterns and for the purpose of presetting a binary register or counter system to a selectable pattern.

SUMMARY

The present invention involves a system for indicating particular see selectable counts in a binary counter or alternatively presetting the same count into the counter for the performance of a different function, the system employing a single gating matrix operated in bilateral fashion to provide the various different functions. The system includes a diode matrix coupled to the output terminals of bistable elements in a binary counter in a selected pattern, the disposition and polarity of the diodes providing a number of individual circuit junctions representing various counts, such that an individual circuit junction goes to ground when all the diodes or a particular combination are negatively biased by the voltages on the associated terminals of the bistable elements in the binary counter. The various individual signal junctions in the diode matrix represent odd valued counts only. A pair of selector switches are employed in conjunction with the binary counter and the matrix. Each of the switches has successive even and odd-valued output terminals, and a central armature successively contacting the output terminals. The even-valued terminals of the first switch are open and the odd-valued terminals are coupled together to the one-valued output terminal of the matrix. The successive odd and even pairs of the second selector switch are coupled together. with the central armature of the first switch coupled in a series circuit with the output terminals of the second switch, the first selector switch provides a disconnect for odd values when even values are chosen by movement of the selector switches. With the arrangement thus described, the binary counter can be preset through the diode matrix by applying a positive pulse through the central armature of the second selector switch to the output terminals of the binary counters. In this manner, the same matrix is used both for identification of particular binary patterns and for the purpose of presetting the binary counter system to a selectable pattern.

BRIEF DESCRIPTION OF THE DRAWING

A better understanding of the invention may be had by reference to the following detailed description when read with reference to the drawing which is a combined block and schematic diagram of the preferred arrangement of a combined count indicating and presetting system in accordance with the invention.

DESCRIPTION OF THE PREFERRED EMBODIMENT

Although the combined count indicating and presetting system of the invention can be advantageously used for many different applications, its operation will be described hereinafter in connection with a video magnetic tape editing system. In that the previously referred to U.S. Pat. application, Ser. No. 329,033, now U.S. Pat. No. 3,342,932, both shows and describes the construction and operation of the editor including the counter system of the present invention in detail, the actual details of the tape editor itself and its operation will be described only briefly.

As shown in the drawing, the combined count indicating and presetting system of the invention includes a binary counter 61 which consists of a number of binary stages, here six in number with only the sixth stage being shown in detail. Each of the binary stages may consist of a conventional binary element, such as a two-transistor flip-flop having suitable interconnection so that it may be shifted alternately into either of two stable states, the connection between stages being in conventional counter fashion suitable for advancing the total count in binary sequence. The outputs from the stages of the counter 61 are interconnected with a bilateral diode matrix 62 and count selector switch unit 63. The bilateral diode matrix 62 contains a number of terminals, each terminal representing a specific count within the binary count sequence and assuming a given output condition when the specific count is contained within the counter 61. The count selector switches within the unit 63 permit the operator to select any one of the particular terminals for connection to a single access line 65. In addition, individual output lines may be permanently connected to certain of the terminals for indicating the attainment of a fixed count.

Edit pulses or any other appropriate indicia to be counted and represented in pulse form are applied to the bases of both transistors in each stage of the binary counter 61 to invert the states of conduction and nonconduction of the transistors in conventional fashion. Reset signals may be applied to the collector of one of the transistors of a pair, and output signals may then be derived at the collector of the other of the transistors of the pair. Equalizing resistors 101 may be coupled to these output terminals of each of the binary divider stages, and provide input connections to the bilateral diode matrix 62.

The bilateral diode matrix 62 is coupled in conjunction with a two-pole multiposition switch arrangement 103A and 103B, which is so arranged in accordance with the invention as to provide, together with the matrix 62, both the desired presetting function and the desired count detection function with a reduced number of components. In the matrix 62, diodes 106 coupled five of the six input terminals to individual signal junctions, which are designated as number 63, number 31 and the like. It will be recognized, inasmuch as the matrix 62 is bilateral, that the designations input and output may be used properly only in conjunction with a particular mode of operation. It will also be noted that the signal junctions, number 63, number 31 and the like, represent only the odd-numbered output values, and that the first binary divider stage is coupled only to the first multiposition selector switch 103A. In this first selector switch 103A, all of the odd-numbered switch terminals are coupled together to the first binary divider stage, while the central armature 108 is coupled through the center tap of the switch 103A to the signal junction designated number 1 in the matrix 62. The even-valued switch positions are open-circuited.

The number 1 junction in the matrix in turn is coupled to the switch terminal designated number 1 in the second switch 103B. In the second switch 103B, however, each even-numbered switch terminal is coupled to the next higher odd-valued switch terminal, which in turn is connected to the corresponding oddivalued junction in the matrix 62. The central armature 109 of the second switch 103B is coupled to the access terminal 65, which delivers an output signal when a desired preset count is made and which receives a preset-count signal when the system is to be preset. The preset signal provides a ground or slightly positive potential to the armature 109 of the second armature of the second selector switch 103B.

The combined count indicating and presetting system of the invention may be used with and its operation explained in conjunction with an electronic video magnetic tape editing system. The magnetic tape to be edited includes a cue track in which the presence or absence of cue pulses indicates the presence or absence of recorded video information in corresponding frames on the tape. When the tape is in motion a separate edit pulse is generated for each frame which passes the various magnetic heads of the system, thereby providing a continuous indication of tape movement regardless of the presence or absence of video information in each frame. During an "animate" mode of operation by the editor, it is desired to erase a predetermined number X of the recorded video frames on the tape. The animate operation begins with the editor detecting the absence of a cue pulse on the cue track, thereby indicating at which video frame the erasing is to begin. In the particular editor disclosed in the previously referred to Pat. application, Ser. No. 329,033, now U.S. Pat. No. 3,342,932, there is a physical spacing of 23 video frames between the cue pulse playback head and the video erase head. Therefore, when the cue playback head senses the absence of a cue pulse, it is necessary to advance the tape 23 frames before erasure of the desired video frames by the editor unit may begin. The bilateral matrix 62 is preset to zero and counts 23 edit pulses corresponding to 23 video frames, whereupon an editor-start signal appears at the No. 23 output of diode matrix 62 to commence video frame erasure in the editor unit. The bilateral matrix 62 is then preset to zero and the system counts X edit pulses, X being the desired number of video frames to be erased and switches 103A and 103B being set in the X position. At the end of the X count, a signal appears at the access terminal 65 to stop erasure of video frames by the editor unit.

The counter system of the invention may also be used to advantage when the editor is operating in an "animate erase" mode of operation. In this mode, a single cue pulse has been removed from the cue track on the tape indicating where the erasure of video frames is to begin. The editor must then erase a desired number of cue pulses so that during a subsequent animate operation the recorded video frames corresponding to the absence of cue pulses on the cue track will be erased. The desired number of cue pulses to be erased, X, is preset into the counter during the start of operation in the animate erase mode by disposing switches 103A and 103B is the X position and applying a preset pulse to terminal 65. As the system receives edit pulses it counts upward from the number X to the number Y = 37 which corresponds to the physical spacing in frames between the cue playback head and the cue erase head in the editor. When the counter reaches a count of 37, junction No. 37 of diode matrix 62 issues an erase signal to the cue erase head and erasure of cue pulses continues until the last previously recorded cueing pulse on the tape is erased.

As an example, assume that the editor is to operate in the "animate" mode and that an X count of four frames is desired. The armatures 108 and 109 of selector switches 103 and 104 are therefore placed at the number 4 selector positions. The counter 61 is reset to zero count by a preset pulse prior to receiving the edit pulses. Thereafter, the diode matrix 62 performs the X count (here 4) and when completed and "editor-stop" signal is returned via terminal 65 to the editor unit to stop further recording of additional frames and new cueing pulses.

As with the operation of a conventional diode matrix, the diodes 106 ad are disposed in the matrix so that the one selected terminal (here No. 5) is to driven to a particular level only when the appropriate binary combination is presented on the output terminals of the various stages of the counter 61. Here the arrangement drives the one selected terminal to ground voltage level. Otherwise, at least one circuit path exists at any output terminal in the matrix to an output terminal in the counter 61 which is not at ground, but at a negative level, and which therefore clamps all but one matrix terminal at a negative level. The X count indication from the matrix 62 terminates the "animate" mode, and another "animate" sequence may be undertaken immediately for the addition of a like number of frames.

In the a "animate erase" mode, the last previously recorded cueing pulse is detected in the same fashion. In order to detect the Y-X (37-X) count the counter 61 is preset to the X count through the selector switches 103A and 103B and the bilateral diode matrix 62. Then, the matrix 62 detects the occurence of the Y value, which actuates the cueing erase operations so as to erase the cueing pulses with the last previously recorded animation sequence.

For presetting, it should be noted that the diodes 106 of the matrix 62 are arranged such that a common path for positive-going signals exists from the selected switch position to the proper output terminals of all of the binary divider stages. Thus the various stages, which are to have one-valued settings, are concurrently shifted in state by the distributed preset signal. The program counter 61 is initially reset by an undelayed preset pulse to a count of all zeros so that only the stages having one-valued counts for the particular preset value will be inverted. When the preset signal is then applied as a ground potential to the collector terminals in the binary divider stages through the selected diode paths, only the selected stages are switched to the opposite binary state. Thus, in the "animate erase" mode, the counter 61 begins with the given X count corresponding to the number of frames used in the particular animation sequence, and proceeds to count upwardly to the fixed Y value of 37 frames.

A feature of the present invention is the achievement of particular economics in the arrangement of the bilateral diode matrix 62 and the multiposition switch 103A and 103B. By coupling the first binary divider stage in series with the first and second switches 103A and 103B, and by interconnecting successive odd and even values in the second switch 103B, half of the selection function is taken over by the switches themselves. The first binary s divider stage, of course, represent 2° in the binary system. When this stage indicates a zero value, positive output signals cannot appear on the odd valued output terminals of the second switch 103B. Accordingly, by mechanically coupling the armatures 108 and 209 together, automatic selection between odd and even values is accomplished.

Also, particular economies are realized in the construction of the bilateral diode matrix 62 itself. It should be noted that a single diode connects each of the signal junctions to the output terminal of the highest order binary divider stage which will be in a binary one state when the counter 61 contains a count equal to the count represented by that signal junction. Each of the higher count junctions is then connected to a lower order count junction which represent the difference in the count represented by the highest order binary stage and the count represented by the particular higher order count junction. The diodes interconnecting the signal junctions are poled to provide a conductive path from the higher order signal junctions through the lower order signal junctions and through the diodes connected thereto to each of output terminals of the lower order stages of the binary counter 61. In this manner, any count within the counter may be detected by the appropriate junction and any count may be set into the counter by application of a signal to the appropriate junction without requiring an unnecessary number of diodes in forming the matrix.

While there has been described above and illustrated in the drawing a preferred arrangement of a combined count indicating and presetting system in accordance with the invention, it will be appreciated that many other modifications, variations and alternative forms are possible. Accordingly, the invention should be considered to include all exemplifications falling within the terms of the appended claims.

I claim:

1. A system for indicating particular selectable counts in a binary counter, or for alternatively presetting the same count into the binary counter for the performance of a different function comprising: a binary counter having a number of bistable elements, each with a pair of output terminals at which applied signals may change the stable state of the particular bistable elements; preset means coupled to the first output terminals of each of the bistable elements of the binary counter; a diode matrix coupled to the second output terminals of the bistable elements of the binary counter in a selected pattern, the disposition and polarity of the diodes providing a number of individual circuit junctions representing various counts, such that an individual circuit junction goes to ground when all the diodes of a particular combination are negatively biased by the voltages on the associated terminals of the bistable elements in the binary counter, the various individual signal junctions in the diode matrix representing odd-valued counts only, a pair of selector switches, each of the selector switches having successive even- and odd-valued output terminals, and central armatures successively contacting the output terminals, central armatures of a first of the selector switches being coupled in a series circuit with the output terminals of the second of the switches, with even-valued terminals of the first switch being open and odd-valued terminals being coupled together to the one-valued output terminal of the diode matrix, the successive odd and even pairs of the second selector switch provides a disconnect for odd values when even values are chosen by movement by the selector switches; and means for presetting the binary counter through the diode matrix means, including means coupled to the central armatures of the second selector switch for applying a positive pulse therethrough to the signal junctions of the diode matrix means and through the diodes thereof to the second output terminals of the binary counters to provide a particular preset pattern therein.

2. A system for indicating a particular count in response to the count pattern of a binary counter comprising a binary counter having a number of binary stages, each stage having first and second bistable states and an output terminal coupled to provide first and second output levels to indicate the instantaneous state of each stage, a plurality of individual signal junctions each representative of a different number in the count sequence of the binary counter, a first plurality of diodes individually connecting each signal junction in a first conducting direction to the output terminal of the highest order binary counter stage which assumes the first bistable state whenever the binary counter contains the count represented by the signal junction, said first plurality of diodes being placed in a forward conducting condition when the associated output terminal has a first output level indicative of said first bistable state, a second plurality of diodes individually connecting each junction in said first conducting direction to another junction representative of the remainder produced by subtracting the count represented by said highest order binary counter stage from the total count represented by the selected junction, count selector means for connecting a selected one of said junctions to a control terminal, output means connected to said control terminal to detect the occurrence of said second output level at the selected junction, and input means connected to said control terminal for applying an input signal at said second output level to the selected junction to thereby set the counter stages to the count indicated by the selected junction.

3. A bidirectional code converter system for use with multibit binary data comprising a binary bit register having a number of binary stages, each stage having first and second bistable states and an output terminal coupled to provide first and second signal levels indicative of the instantaneous state of each stage, a plurality of individual signal junctions, each representative of a different set of binary data bits which may be contained in the binary bit register, a first plurality of diodes individually connecting each signal junction in a first conducting direction to the output terminal of a particular binary stage of said binary bit register which is in a first bistable state whenever the binary bit register contains the particular set of binary data bits represented by the junction, a second of plurality of diodes individually connecting each junction in said first conducting direction to another junction representative of another set of binary data which would result by changing the state of said particular binary stage of said binary bit register, said first plurality of diodes being placed in a forward conducting condition when the associated output terminal has a first signal level indicative of said first bistable state, and selector means for connecting a selected one of said junctions to a control terminal, whereby said control terminal assumes a second signal level only when the stages of said binary bit register contain a set of binary data bits represented by the selected junction, and wherein said second signal level may be applied to said control terminal to control the state of the binary stages of the binary bit register to assume the first or second bistable state in accordance with the said binary data represented by the selected junction.

4. A diode matrix system for connecting a digital register containing a number of digital stages to a control terminal, said digital register having an output terminal from each digital stage to provide distinct output levels indicative of the digit contained therein, comprising a plurality of individual signal junctions, each representative of a different multidigit condition of the digital stages, a first plurality of diodes individually connecting each junction in a first conducting direction to the output terminal of a selected one of the digital stages which assumes a first digital state whenever the stages of the digital register contain the multidigit condition represented by the respective junction, a second plurality of diodes individually connecting each junction in said first conducting direction to another junction representative of the multidigit condition of the remaining digital stages when the register contains the count represented by the respective junction, said first plurality of diodes being placed in a forward conducting condition by a first digital state occurring at said selected one of the digital stages, and selector means for connecting a selected one of said junctions to the control terminal, whereby said control terminal assumes the output level of a first digital state whenever the digital stages assume the multidigit condition represented by said junction, and wherein the application of a second digital level to said control terminal causes said digital stages to assume a state represented by the selected signal junction.

5. A diode matrix system for identifying a particular combination of binary output levels appearing at a number of input terminals or for applying a particular combination of first and second binary signal levels to the input terminals comprising a plurality of individual signal junctions, each representative of a different combination of binary signal levels at the input terminals, a matrix arrangement of diodes providing individual connections from each junction to a selected one of the input terminals which assumes a second binary signal level whenever the particular combination represented by the junction is applied to the input terminal and for interconnecting each selected junction to another junction representative of the binary signal levels applied to the remaining input terminals when the particular combination is applied, so that at least one of the diodes connecting a selected junction to the input terminals is in a forward conducting direction whenever the particular binary signal level combination represented by the selected junction is not applied to the input terminals, thereby placing said junction at said first binary signal level; selector means for connecting the selected one of said junctions to a control terminal, and means coupled to said control terminal to detect said second binary signal level and also being capable of applying said second binary signal level to said control terminal to be applied through the matrix to selected ones of the access terminals in accordance with the particular combination represented by the selected junction.

6. An electrical counting system for indicating a particular selectable count and being capable of being preset to a particular selectable count, comprising:

binary counter means having a number of bistable stages;

diode matrix means coupled to said bistable stages and having a number of individual signal junctions each representing a unique counting state of said counter means;

selector switch means having a number of output terminals each representing one of said counting states and a common terminal for selective individual electrical connection to each of said output terminals, said output terminals being connected to said junctions; and access means connected to said common terminal of said switch means and being adapted to issue a signal transition in response to said binary counter means attaining a particular count selected by said selector means and being adapted to receive an electrical preset pulse for presetting said bistable stages of said counter means to a counting state selected by said selector switch means, said preset pulse being directed to appropriate bistable stages by means of said selector switch means and said diode matrix means.

7. The counting system as defined in claim 6, each of said bistable stages of said counter means having a pair of outputs exhibiting mutually exclusive electrical conditions and being capable of responding to applied signals to change the state of an associated said stage, and said diode matrix being coupled to one of each of said pair of outputs.